United States Patent [19]

Mochizuki et al.

[11] Patent Number: 4,499,113

[45] Date of Patent: Feb. 12, 1985

[54] PROCESS FOR PREPARING SNACK PRODUCTS WITH EXPANDED COATING

[75] Inventors: Keizo Mochizuki; Yukio Kuwada, both of Kanagawa; Yoshihiko Mizoguchi, Tokyo, all of Japan

[73] Assignee: Meiji Seika Kaisha, Ltd., Tokyo, Japan

[21] Appl. No.: 411,785

[22] Filed: Aug. 26, 1982

[30] Foreign Application Priority Data

Aug. 26, 1981 [JP] Japan ................................. 56-133647

[51] Int. Cl.$^3$ ............................................... A23G 3/00
[52] U.S. Cl. ..................................... 426/291; 426/293; 426/296; 426/438; 426/89; 426/93; 426/103
[58] Field of Search ................... 426/89, 93, 94, 103, 426/289, 291, 293, 296, 302–305, 309, 438–440, 808, 660–661, 559

[56] References Cited

U.S. PATENT DOCUMENTS 3,647,474  3/1972  Dame, Jr. et al. .................. 426/331
4,053,650  10/1977 Chino ................................. 426/305

Primary Examiner—Raymond Jones
Assistant Examiner—Elizabeth A. King
Attorney, Agent, or Firm—Sughrue, Mion, Zinn, Macpeak & Seas

[57] ABSTRACT

A process for producing a snack product with an expanded coating comprising a core material selected from the group consisting of nuts, beans, seeds, expanded starchy materials coated with fatty confectionary material and shaped fatty confectionary material. While being tumbled, the core material is given a first coating by alternately sprinkling or spraying a 60:40 to 30:70 mixture by weight of a starchy flour that has small expandability but provides good savor and a highly expandable pregelatinized starchy flour and an aqueous sugar solution comprising corn syrup or a mixture of 1 part by weight of corn syrup and not more than 2 parts by weight of sucrose that is dissolved in water to give a refractive Brix value between 30 and 40. The coated core material is then given a second coating by alternately sprinkling or spraying a mixture of the less expandable but highly savory starchy flour with an equal or less amount by weight of the highly expandable pregelatinized starchy flour and an aqueous sugar solution that comprises sucrose or a mixture of 2 parts by weight of sucrose and not more than 1 part by weight of corn syrup and/or soluble starch that is dissolved in water to give a refractive Brix value between 50 and 60. The core material with the first and second coatings is then fried after optional drying.

8 Claims, No Drawings

PROCESS FOR PREPARING SNACK PRODUCTS WITH EXPANDED COATING

FIELD OF THE INVENTION

The present invention relates to a process for preparing snack products having an expanded coating, and more particularly, to snack products twice coated with a mixture of two starchy flours having different degrees of expandability and an aqueous sugar solution in a two layers structure on the surface of a core material selected from nuts, seeds, beans, expanded starchy materials coated with fatty confectionary material and shaped fatty confectionary materials. The process of the present invention does not use a leavening agent and yet provides a snack product with a coating that expands at a desired rate of expansion during frying and is crisp and palatable. As a further advantage, the meltable core material does not flow out of the product during expansion by frying.

BACKGROUND OF THE INVENTION

A typical Japanese snack product with a coating that is expanded by frying is referred to the name "Onorokemame". Conventionally, "Onorokemame" is made from a formulation that contains mainly wheat flour and a large amount of expandable pregelatinized starchy flour such as pregelatinized waxy corn flour or pregelatinized glutinous rice flour that expands with heat to provide a fully expanded product. However, there was no use of the starchy flour which is less expandable but provides good savor such as mashed potato flour and corn flour, thus, a fully savory product was not obtained. In accordance with the conventional method of making "Onorokemame", the core material is coated with a layer of starchy flour that has a single degree of expandability. Accordingly, the expansion of the coating during heating is difficult to control, and hence it is difficult to provide a product that has a suitable degree of hardness. Japanese Patent Publication No. 20584/78 (corresponding to U.S. Pat. No. 4,053,650) describes a process that improves and controls the expansion of the coating simultaneously. The process involves expanding a formulation uniformly within a baking mold without using a large amount of highly expandable starchy flour. However, this process is costly because it requires the use of a special baking mold.

SUMMARY OF THE INVENTION

As a result of various studies to eliminate the defects of the conventional process of making snack products with expanded coatings, the present inventors have been able to prepare a snack product that is crisp and palatable. The product can be prepared from a starchy flour formulation that contains a smaller amount of highly expandable pregelatinized starchy flour and 50 to 77.5% by weight, based on the total starchy flour, of less expandable starchy flour such as mashed potato flour and corn flour. The formulation is coated over the core material without a leavening agent. The coated core material is then fried to expand the coating. The snack product prepared in this manner has the same good savor as the less expandable starchy flour. The present inventors have also found that by this method, a snack product containing a core of a shaped fatty confectionary material such as fatty cream or chocolate, can be produced without the core flowing out during frying.

DETAILED DESCRIPTION OF THE INVENTION

The core material used in the process of the present invention is selected from nuts (for example, almond, hazelnut, groundnut, chestnut, cashew nut, Brazil nut, walnut, Macadamia nut, pecan nut, and so on), seeds, beans, expanded starchy materials coated with fatty confectionary material (for example, expanded rice, popcorn and puffed barley which are coated with fatty cheesy cream or chocolate), and shaped fatty confectionary material (for example, fatty cream and chocolate).

The core material is given a first coating comprising a mixture of two different types of starchy flour. The first type of starchy flour is comprised of at least one starchy flour that has small expandability but provides good savor, for example, mashed potato flour, corn flour and green pea flour. The second type of starchy flour is comprised of at least one highly expandable pregelatinized starchy flour, for example, pregelatinized waxy corn flour and pregelatinized glutinous rice flour. The mixing ratio of the first type of starchy flour to the second type of pregelatinized starchy flour is 60:40 to 30:70 by weight. The first coating also includes an aqueous sugar solution that comprises corn syrup (i.e., glucose syrup) or a mixture of corn syrup and sucrose to which water has been added to achieve a refractive Brix value of 30 to 40. This first coating is capable of greatly expanding during frying and is formed by spraying or sprinkling the starchy flour mixture and aqueous sugar solution alternately over the core material in a tumbling coater such as a revolving pan or rotary drum.

The core material is then given a second coating. This coating is comprising a mixture of the less expandable but savory starchy flour with an equal or less amount by weight of the highly expandable pregelatinized starchy flour and an aqueous sugar solution that comprises sucrose or its mixture with corn syrup and/or soluble starch to which water has been added to achieve a refractive Brix value of 50 to 60. The second coating is less expandable than the first coating during frying and is formed by spraying or sprinkling the starchy flour mixture and aqueous sugar solution alternately over the core material in a tumbling coater such as a revolving pan or rotary drum.

To provide a highly expanded snack product that is crisp and palatable, the weight ratio of the first coating to second coating is preferably in the range of from about 50:50 to 60:40. The core material with the first and second coatings is subjected to a third step where it is fried after optional drying. The result is a desired highly expanded snack product which is crisp and has good palatability.

Preferred examples of the highly expandable pregelatinized starchy flour to be used in the first and second coatings are pregelatinized waxy corn flour and pregelatinized glutinous rice flour, and examples of the less expandable but highly savory starchy flour are mashed potato flour and corn flour. The preferred mixing ratio of the less expandable but highly savory starchy flour to the highly expandable pregelatinized starchy flour in the first coating is in the range of from 60:40 to 30:70 by weight. If the proportion of the highly expandable pregelatinized starchy flour is less than 40% by weight, the desired expansion of the first coating cannot be achieved, and if the proportion exceeds 70% by weight, the first coating expands too much to provide a uniformly expanded snack product.

The aqueous sugar solution for making the first coating is comprised of corn syrup with a DE of 40 to 50 and a water content of 25% (the term "syrup" as used hereinafter means syrup having this percentage of water) and which has a refractive Brix value of 30 to 40. Alternatively, it may be comprised of a mixture of one part by weight of corn syrup and not more than 2 parts by weight of sucrose to which water has been added to provide a refractive Brix value of 30 to 40. If the refractive Brix value of the aqueous sugar solution is less than 30, it is difficult to form a uniform first coating on the core material, and if the refractive Brix value exceeds 40, the first coating shrinks during frying and a product with a uniformly expanded coating cannot be obtained. If the proportion of sucrose to corn syrup exceeds 2 parts by weight, the first coating shrinks during frying and a product with a uniformly expanded coating cannot be obtained. Therefore, if a mixture of corn syrup and sucrose is used as an aqueous sugar solution for making the first coating, the mixing ratio must not be more than 2 parts by weight of sucrose to one part by weight of corn syrup and water must be added to provide a refractive Brix value of from 30 to 40.

The preferred ratio of the thickness of the first coating to that of the second coating is such that the weight proportion of the first coating to the second coating is in the range of from 50:50 to 60:40. In other words, the thickness of the first coating is from 50 to 60% by weight of the total of both coatings. If the thickness of the first coating is such that its weight exceeds 60% of the weight of the total of both coatings, the coating will rupture during frying and a product with a uniform coating cannot be obtained. If the weight of the first coating is less than 50% of the weight of the total of both coatings, the resulting product will not have an adequately expanded coating.

The first coating is formed and then a second coating is given. A mixture of highly expandable pregelatinized starchy flour and less expandable starchy flour is also used in the second coating. The preferred highly expandable pregelatinized starchy flour is comprised of at least one flour selected from among pregelatinized waxy corn flour and pregelatinized glutinous rice flour. At least one flour selected from among mashed potato flour and corn flour is preferred as the less expandable starchy flour since it also provides good savor. If more savor is necessary, other starchy flours having low expandability (such as non-glutinous rice flour or pea flour) may be used.

In the second coating, the highly expandable pregelatinized starchy flour is preferably used in a weight amount not greater than that of the less expandable starchy flour, namely, the weight ratio of the highly expandable pregelatinized starchy flour to the less expandable starchy flour is in the range of from 5:95 to 50:50. If the weight of the highly expandable pregelatinized starchy flour is less than 5% of the total starchy flour, the surface of the product expanded by frying has a tendency to become coarse. However, no additional disadvantages result even if less than 5% by weight of the highly expandable pregelatinized starchy flour is used. If the proportion of the highly expandable pregelatinized starchy flour exceeds 50% by weight, the desired crisp product is not obtained.

The preferred aqueous sugar solution for making the second coating comprises sucrose or a mixture of 2 parts by weight of sucrose and not more than one part by weight of corn syrup and/or soluble starch that is given water to provide a refractive Brix value of 50 to 60. If sucrose alone or a mixture of sucrose and corn syrup is not suitable due to being too sweet, a part of the sucrose or a part or all of the corn syrup can be replaced by less sweet soluble starch to reduce its sweetness. If the aqueous sugar solution has a refractive Brix value of less than 50, the second coating does not expand adequately during frying. If the refractive Brix value exceeds 60, it becomes difficult to make the starchy flour mixture to attach to the first coating uniformly and to form a uniform layer of the starchy flour mixture on the first coating.

The refractive Brix value of the aqueous sugar solution to be added to starchy flour affects the expandability of coatings during frying. Thus, in order to obtain a desired product, the refractive Brix values of the first and the second aqueous sugar solutions must be adjusted to a range of 30 to 40 and a range of 50 to 60, respectively.

The first and second coatings are formed by spraying or sprinkling the aqueous sugar solution and starchy flour mixture alternately over the core material in a tumbling coater such as a revolving pan or rotary drum.

The core material with the first and second coatings formed by the above procedure is subjected to a conventional frying step after optional drying. The frying step is carried out at 160° to 200° C. for 30 seconds to 3 minutes, preferably at 165° to 175° C. for 1 minute and 30 seconds to 2 minutes and 30 seconds, more preferably at 168° to 173° C. for 100 seconds to 130 seconds.

One advantage of the present invention is that a crisp and highly expanded snack product can be produced even if the proportion of the less expandable starchy flour to be included in the total coating is as great as about 77.5% by weight.

According to the present invention, a crisp and palatable expanded snack product can be obtained without using a leavening agent or other additives that impair the savor of the product or give it an undesired taste. Probably because of the high expandability of the first coating, even if a shaped fatty confectionary material is used as the core material, the first coating on the core material expands before the expansion of the second coating and melting and leakage of the shaped fatty confectionary material. That is, the expanded first coating provides a space between the core material and the first coating which prevents rapid heat transfer to the core material and helps the entire coating to be expanded during frying without permitting the shaped fatty confectionary material (as core material) to flow out of the coating. Therefore, the process of the present invention requires no special treatment for preventing the leakage of the shaped fatty confectionary material from the coating layer, for example, a treatment of forming a sugar coating on the shaped fatty confectionary material which takes a great deal of time and labor.

According to the present invention, the less expandable starchy flour such as mashed potato flour or corn flour is used in an amount at least half of the total starchy flour used so as to exhibit its savor to the fullest. The maximum amount of the highly expandable starchy flour used in the total starchy flour is reduced to half so as to provide a formulation that can be expanded greatly by frying and give a crisp and palatable hollow snack product without using a leavening agent or other additives that impair or give an undesirable taste to the product. Even if shaped fatty confectionary material such as chocolate or fatty cream is used as the core material, the desired snack product with an expanded coating can be obtained without causing the core material to flow out of the expanded coating as a result of frying.

To show the advantages of the process of the present invention, we prepared snack products according to the process of the present invention and the conventional method of making "Onorokemame" but using the starchy flour formulations of the present invention (i.e., the starchy flour formulations of the present invention is applied to the conventional single coating method). The core material used was expanded rice flour coated with fatty cheesy cream. The core material was coated with starchy flour formulations that were made of pregelatinized waxy corn flour (as highly expandable starchy flour) and mashed potato flour (as less expandable starchy flour) in various weight ratios. The characteristics of the snack products including the weight proportion of mashed potato flour to pregelatinized waxy corn flour in the total coating, the weight ratio of the first to second coatings, the weight proportion of the two starchy flours in each coating, and the degree of expansion of each snack product after frying are listed in Table 1.

As shown in Table 1, a snack product prepared by frying a formulation containing 70% of mashed potato flour and 30% of pregelatinized waxy corn flour in the overall coating, using the first and second coatings in a weight ratio of 60:40, and containing 60% of mashed potato flour and 40% of pregelatinized waxy corn flour in the first coating, 85% of mashed potato flour and 15% of pregelatinized waxy corn flour in the second coating had an expansion ratio of 2.70. But the snack product prepared by the conventional method of making "Onorokemame" using a formulation containing 70% of mashed potato flour and 30% of pregelatinized waxy corn flour in the overall coating had an expansion ratio of only 1.50. It is, therefore, clear that the process of the present invention provides a snack product with an expanded coating whose expansion ratio is 1.8 times as much as the ratio achieved by the conventional method.

The snack product prepared by frying a formulation that had the first and second coatings in a weight ratio of 50:50 and used 50% of mashed potato flour and 50% of pregelatinized waxy corn flour in the first coating and 70% of mashed potato flour and 30% of pregelatinized waxy corn flour in the second coating so as to incorporate 60% of mashed potato flour and 40% of pregelatinized waxy corn flour in the overall coating had an expansion ratio of 3.57. But the snack product

TABLE 1

| Coating Method | Weight Proportion of Two Starchy Flours in the Overall Coating | | Weight Ratio of the Two Coatings | | Proportion of Two Starchy Flours in Each Coating | | | | Ratio of Expansion after Frying |
|---|---|---|---|---|---|---|---|---|---|
| | | | | | First Coating | | Second Coating | | |
| | Mashed Potato Flour (%) | Pregelatinized Waxy Corn Flour (%) | First Coating (%) | Second Coating (%) | Mashed Potato Flour (%) | Pregelatinized Waxy Corn Flour (%) | Mashed Potato Flour (%) | Pregelatinized Waxy Corn Flour (%) | |
| Present Invention | 50 | 50 | 50 | 50 | 50 | 50 | 50 | 50 | 3.86 |
| | 60 | 40 | 50 | 50 | 50 | 50 | 70 | 30 | 3.57 |
| | 62.5 | 37.5 | 50 | 50 | 30 | 70 | 95 | 5 | 4.00 |
| | 70 | 30 | 60 | 40 | 60 | 40 | 85 | 15 | 2.70 |
| | 74 | 26 | 60 | 40 | 60 | 40 | 95 | 5 | 2.40 |
| | 77.5 | 22.5 | 50 | 50 | 60 | 40 | 95 | 5 | 1.85 |
| Conventional Method of Making "Onorokemame"* | 70 | 30 | — | — | — | — | — | — | 1.50 |
| | 60 | 40 | — | — | — | — | — | — | 2.14 |
| | 77.5 | 22.5 | — | — | — | — | — | — | 1.10 |

*Weight proportion of two starchy flours in the overall coating according to the present invention is applied to conventional method of making "Onorokemame".

In Table 1, the figures in the column "Weight Proportion of Two Starchy Flours in the Overall Coating" indicate by percentage the weight proportion of mashed potato flour to pregelatinized waxy corn flour in the overall coating on the core material.

The figures in the column "Weight Ratio of the Two Coatings" indicate by weight percentage the thickness of each of the first and second coatings with respect to the overall coating.

The figures in the column "Proportion of Two Starchy Flours in Each Coating" indicate in weight percentage the proportion of highly expandable pregelatinized waxy corn flour to less expandable mashed potato flour contained in each of the first and second coatings.

The figures in the column "Ratio of Expansion after Frying" indicate the degree of expansion as calculated by dividing the volume of the expanded product by that of the unexpanded product made by applying the first and second coatings on the core material.

prepared by the conventional method of making "Onorokemame" using a formulation containing 60% of mashed potato flour and 40% of pregelatinized waxy corn flour in the overall coating had an expansion ratio of 2.14. It is, therefore, clear that the process of the present invention provides (from a formulation with a mashed potato to pregelatinized corn ratio of 60:40 in the overall coating) a snack product with an expanded coating whose expansion ratio is about 1.7 times as much as the ratio achieved by the conventional method. In the above test, the first coating also contained an aqueous sugar solution that contained only corn syrup and which was adjusted to a refractive Brix value of 35, and the second coating also contained an aqueous sugar solution that contained only sucrose and which was adjusted to a refractive Brix value of 55. In the conventional method of making "Onorokemame", an aqueous sugar solution was used that had the same formulation and Brix value as those of the sum of the aqueous sugar solutions used for the first and second coatings according to the present invention.

The data in Table 1 shows that the process of the present invention is capable of providing a fried snack product with a greatly expanded coating by using a flour formulation containing 50 to 77.5% of less expandable but highly savory starchy flour such as mashed potato flour or corn flour without incorporating a leavening agent or other additives that impair the savor of the product or give it an undesired taste.

The present inventors then measured the strength (hardness) of fried snack products prepared from two formulations, one containing 70% of mashed potato flour and 30% of pregelatinized waxy corn flour in the overall coating, and the other containing 60% of mashed potato flour and 40% of pregelatinized waxy corn flour, by the process of the present invention and the conventional method of making "Onorokemame". The results are shown in Table 2, wherein the strength of each product is indicated by the weight in grams of the load necessary to rupture the product.

TABLE 2

| Weight Proportion of Two Starchy Flours in Overall Coating | | Strength of Product | |
|---|---|---|---|
| Mashed Potato Flour (%) | Pregelatinized Waxy Corn Flour (%) | Present Invention (g) | Conventional Method (g) |
| 70 | 30 | 1,600 | 4,000 |
| 60 | 40 | 1,500 | 3,500 |

In Table 2, the figures in the column "Weight Proportion of Two Starchy Flours in Overall Coating" indicate the proportions of mashed potato flour and pregelatinized waxy corn flour contained in the overall coating on the core material. The figures in the column "Strength of Product" indicate the weight in grams of the load necessary to rupture the fried snack products prepared by the process of the present invention and the conventional method of making "Onorokemame".

The snack product prepared by the present invention from a formulation containing 70% mashed potato flour and 30% pregelatinized waxy corn flour ruptured under a load of 1,600 g, whereas the product made from the same formulation but by the conventional method ruptured under a load of 4,000 g and was at least twice as hard as the product according to the present invention. This indicates the low palatability of the conventional product which was confirmed by an organoleptic test the results of which are listed in Table 3 below.

The snack product prepared by the present invention from a formulation containing 60% mashed potato flour and 40% pregelatinized waxy corn flour in the overall coating ruptured under a load of 1,500 g. However, the product made from the same formulation but by the conventional method ruptured under a load of 3,500 g and was at least twice as hard as the product of the present invention. This also indicates the low palatability of the conventional product which was confirmed by the same organoleptic test as mentioned above. The load necessary to rupture the snack products was measured with a Kuramochi hardness meter; it comprised a spring scale and a table which compressed the sample until it broke under a certain load that was read on the spring scale.

Two fried snack products were prepared by the process of the present invention and the conventional method of making "Onorokemame" and were subjected to an organoleptic test by a panel consisting of 30 in-house professional tasters. The product of the present invention was prepared from a starchy flour formulation containing 62.5% of mashed potato flour and 37.5% of pregelatinized waxy corn flour in the overall coating. Half of the coating was the first coating made of 30% of mashed potato flour and 70% of pregelatinized waxy corn flour, and the other half was the second coating made of 95% of mashed potato flour and 5% of pregelatinized waxy corn flour. The first coating also contained an aqueous sugar solution comprising one part by weight of corn syrup and the same amount of sucrose that was given water to have a refractive Brix value of 35. The second coating also contained an aqueous sugar solution comprising one part by weight of sucrose and the same amount of soluble starch that was given water to have a refractive Brix value of 55. The product according to the conventional method was also prepared from a starch formulation containing 62.5% of mashed potato flour and 37.5% of pregelatinized waxy corn flour in the overall coating, but it used an aqueous sugar solution which was a mixture of equal amounts of the sugar solutions used for making the first and second coatings of the product of the present invention.

The two products were evaluated for their appearance, crispness, meltability in the mouth, taste and color, and the scores given by the panelists for each factor were averaged and listed in Table 3.

TABLE 3

| | Product | |
|---|---|---|
| Factor | Present Invention | Conventional Method |
| Appearance | +2.90 | −0.50 |
| Crispness | +2.80 | −1.00 |
| Melt in the mouth | +2.90 | 0.00 |
| Taste | +2.70 | +1.05 |
| Color | +2.00 | −1.00 |
| Criteria of Evaluation | | |
| +3: Best | | |
| +2: Good | | |
| +1: Fairly good | | |
| 0: Fair | | |
| −1: Fairly poor | | |
| −2: Poor | | |
| −3: Worst | | |

As Table 3 shows, the product of the present invention was much preferred over the conventional product with respect to appearance, crispness, melting in the mouth and color, and the taste of the former was evaluated somewhat higher than the latter.

The present invention is now described in greater detail by reference to the following examples which are given here for illustrative purposes only and are by no means intended to limit its scope. All parts in the examples are by weight.

EXAMPLE 1

A mixture of 50 parts of pregelatinized waxy corn flour and 50 parts of mashed potato flour and 100 parts of an aqueous sugar solution comprising corn syrup that was given water to adjust its refractive Brix value to 35 were used as materials for the first coating. The aqueous sugar solution was sprinkled over 80 parts of core material, in a rotary pan, comprised of expanded rice coated with fatty cheesy cream. When the core material was uniformly coated with the aqueous sugar solution, the starchy flour mixture was then sprinkled. This procedure was repeated until a uniform first coating was formed on the core material. A second coating was thereafter formed on the first coating by alternately sprinkling a mixture comprising 20 parts of pregelatinized waxy corn flour and 47 parts of mashed potato flour and 67 parts of an aqueous sugar solution comprising sucrose that was mixed with water to give a refractive Brix value of 55. The core material with the first and second coatings was taken out of the rotary pan, left at ambient temperature for 30 minutes and deep fried for 1 minute and 50 seconds in a cooking oil that had been heated to 170° C. to thereby produce a crisp snack product with an expanded coating having an expansion ratio of 3.5 and a hardness of 1,600 g.

EXAMPLE 2

150 g of ball-shaped chocolate centers each weighing 1 g were put in a revolving pan and, while being tumbled, each center was given a first coating as in Example 1 using a starchy flour comprising 33.8 parts of pregelatinized waxy corn flour and 50.8 parts of corn flour and 85 parts of an aqueous sugar solution comprising a mixture of 2 parts of corn syrup and 1 part of sucrose that was dissolved in water to give a refractive Brix value of 35. A second coating was thereafter formed on the first coating as in Example 1 using a starchy flour comprising 8.4 parts of pregelatinized waxy corn flour and 48 parts of corn flour and 56 parts of an aqueous sugar solution comprising a mixture of 2 parts of sucrose and 1 part of corn syrup that was dissolved in water to give a refractive Brix value of 55. The ball-shaped chocolate centers with the first and second coatings were immediately immersed in a cooking oil that had been heated to 170° C. and fried for 2 minutes. Crisp snack products with an expanded coating that had an expansion ratio of 3.3 and a hardness of 1,700 g were obtained. There was no indication of the flowing out of chocolate from the expanded coating.

EXAMPLE 3

150 parts of ball-shaped white cream centers each weighing 1 g were put in a revolving pan and, while being tumbled, each center was given a first coating as in Example 1 using a starchy flour comprising 52.5 parts of pregelatinized waxy corn flour and 22.5 parts of mashed potato flour and an aqueous sugar solution comprising corn syrup that was dissolved in water to give a refractive Brix value of 35. A second coating was then formed on the first coating as in Example 1 using a starchy flour comprising 7.5 parts of pregelatinized waxy corn flour and 142.5 parts of mashed potato flour and an aqueous sugar solution comprising sucrose that was dissolved in water to give a refractive Brix value of 50, and the ball-shaped white cream centers with the first and second coatings were fried as in Example 1. Ball-shaped crisp snack products with an expanded coating that had an expansion ratio of 4.0 and a hardness of 1,300 g were obtained.

EXAMPLE 4

A mixture of 50 parts of glutinous rice flour and 50 parts of pea flour and an aqueous solution of soluble starch comprising 35 parts of solid soluble starch and 65 parts of water were used as materials for the first coating. The aqueous starch solution was sprinkled over 80 parts of a core material in a revolving pan that comprised expanded rice flour coated with a fatty cheesy cream. When the core material was uniformly coated with the aqueous starch solution, the starchy flour mixture was then sprinkled thereon. This procedure was repeated until a uniform first coating was formed on the core material. A second coating was thereafter formed on the first coating by alternately sprinkling a mixture comprising 20 parts of glutinous rice flour and 47 parts of pea flour and 67 parts of an aqueous sugar solution comprising sucrose that was mixed with water to give a refractive Brix value of 55. The core material with the first and second coatings was taken out of the revolving pan, left at ambient temperature for 30 minutes and fried for 1 minute and 50 seconds in a cooking oil that had been heated to 170° C. to thereby produce a crisp snack product with an expanded coating having an expansion ratio of 3.8 and a hardness of 2,000 g.

While the invention has been described in detail and with reference to specific embodiments thereof, it will be apparent to one skilled in the art that various changes and modifications can be made therein without departing from the spirit and scope thereof.

What is claimed is:

1. A process for producing an edible snack product with an expanded coating, comprising the steps of:
   providing a core material selected from the group consisting of nuts, beans, an expanded edible starchy material coated with an edible fatty confectionary material and a shaped fatty confectionary material;
   providing a first flour mixture comprised of 60:40 to 30:70 parts by weight of a starchy flour capable of providing a small degree of expansion and good savor upon frying and a pregelatinized starchy flour capable of providing a high degree of expansion upon frying;
   providing a first aqueous sugar solution having a refractive Brix value of between 30 and 40;
   coating said core material with a first coating by alternately applying the first flour mixture and the first aqueous sugar solution to form a uniform coating on the core material;
   providing a second flour mixture comprised of a starchy flour capable of providing a small degree of expansion and good savor upon frying and an equal or less amount of weight of a pregelatinized starchy flour capable of providing a high degree of expansion upon frying;
   providing a second aqueous sugar solution having a refractive Brix value of between 50 and 60;
   coating the first coating with a second coating which is less expandable than the first coating during frying by alternately applying the second flour mixture and the second aqueous sugar solution in order to form a uniform second coating;
   controlling the thickness of the first coating and the second coating so that the weight ratio of the first coating to the second coating is in the range of from 50:50 to 60:40; and
   frying the core material with the first and second coatings thereon.

2. A process as claimed in claim 1, wherein the starchy flour capable of providing a small degree of expansion and good savor upon frying in the first flour mixture and in the second flour mixture is at least one starchy flour selected from the group consisting of mashed potato flour and corn flour.

3. A process as claimed in claim 1, wherein the pregelatinized starchy flour in the first flour mixture and in the second flour mixture, is at least one flour selected from the group consisting of pregelatinized waxy corn flour and pregelatinized glutinous rice flour.

4. A process as claimed in claim 1, wherein the weight ratio of the pregelatinized starchy flour to the starchy flour capable of providing a small degree of expansion and good savor upon frying in the second flour mixture is in the range of from 5:95 to 50:50.

5. A process as claimed in claim 1, wherein the first aqueous sugar solution has a refractive Brix value of 30 to 40 and comprises corn syrup or a mixture of 1 part by weight of corn syrup and not more than 2 parts by weight of sucrose to which a sufficient amount of water is added to adjust the refractive Brix value to 30 to 40.

6. A process as claimed in claim 1, wherein the second aqueous sugar solution has a refractive Brix value of 50 to 60 and comprises sucrose or a mixture of 2 parts by weight of sucrose and not more than 1 part by weight of at least one ingredient selected from the group consisting of corn syrup and soluble starch to which a sufficient amount of water is added to adjust the refractive Brix value to 50 to 60.

7. A process as claimed in claim 1, wherein a weight proportion of the starchy flour capable of providing a small degree of expansion and good savor upon frying to the pregelatinized starchy flour capable of providing a high degree of expansion upon frying in the overall coating is 50:50 to 77.5:22.5.

8. A process according to claim 1, wherein the first flour mixture has a composition which is different from the composition of the second flour mixture.

* * * * *